(12) United States Patent
Fischer et al.

(10) Patent No.: US 8,419,058 B2
(45) Date of Patent: Apr. 16, 2013

(54) DUAL VOLUME AIR BAG

(75) Inventors: Kurt F. Fischer, Leonard, MI (US); Douglas M. Gould, Lake Orion, MI (US); Simon Kramer, Schorndorf (DE); Daniele Aranzulla, Essingen (DE); Martin Burkhardtsmaier, Schwaebisch Gmund (DE); Jochen Weiss, Abtsgmuend (DE); Bernd Issler, Schorndorf (DE)

(73) Assignee: TRW Vehicle Safety Systems Inc., Washington, MI (US)

( * ) Notice: Subject to any disclaimer, the term of this patent is extended or adjusted under 35 U.S.C. 154(b) by 207 days.

(21) Appl. No.: 12/884,619

(22) Filed: Sep. 17, 2010

(65) Prior Publication Data

US 2011/0031723 A1 Feb. 10, 2011

Related U.S. Application Data

(63) Continuation-in-part of application No. 12/077,826, filed on Mar. 21, 2008.

(51) Int. Cl.
*B60R 21/18* (2006.01)
*B60R 21/2342* (2011.01)

(52) U.S. Cl.
USPC ..... 280/743.2; 280/739; 280/742; 280/743.1; 280/728.1; 280/735

(58) Field of Classification Search ............... 280/730.1, 280/743.2, 739, 728.1, 735, 736, 742, 743.1
See application file for complete search history.

(56) References Cited

U.S. PATENT DOCUMENTS

| | | | |
|---|---|---|---|
| 5,308,113 A | 5/1994 | Moriset | |
| 5,489,119 A | 2/1996 | Prescaro et al. | |
| 5,613,708 A | 3/1997 | Bleider et al. | |
| 5,678,858 A | 10/1997 | Nakayama et al. | |
| 5,813,696 A | 9/1998 | Hill | |
| 5,887,894 A | 3/1999 | Castagner et al. | |
| 5,997,037 A | 12/1999 | Hill et al. | |
| 6,076,854 A | 6/2000 | Schenck et al. | |
| 6,390,501 B1 | 5/2002 | Greib et al. | |
| 6,454,300 B1 | 9/2002 | Dunkle et al. | |
| 6,502,858 B2 | 1/2003 | Amamori | |
| 6,511,094 B2 | 1/2003 | Thomas et al. | |
| 6,561,545 B2 | 5/2003 | Greib et al. | |
| 6,616,184 B2 | 9/2003 | Fischer | |
| 6,932,384 B2 * | 8/2005 | Waid et al. .......... | 280/739 |

(Continued)

FOREIGN PATENT DOCUMENTS

DE 102007010323 10/2007
DE 60035287 2/2008

*Primary Examiner* — Eric Culbreth
*Assistant Examiner* — Karen A Beck
(74) *Attorney, Agent, or Firm* — Tarolli, Sundheim, Covell & Tummino LLP

(57) ABSTRACT

An air bag module (30) includes an air bag (14) having a deflated condition and an inflated condition and a structure (34) for supporting the air bag. A first tether (106) has a first end connected to the structure via an actuatable fastener (122) and an opposite second end connected to the air bag (14). A second tether (104) having a first end secured to the first tether (106) by a releasable connection (132) at a location between the first and second ends of the first tether. The second tether has a second end connected to a deployable portion of the air bag (14).

33 Claims, 12 Drawing Sheets

U.S. PATENT DOCUMENTS

| | | |
|---|---|---|
| 7,093,854 B2 | 8/2006 | Fischer et al. |
| 7,134,691 B2 | 11/2006 | Dunkle et al. |
| 7,192,053 B2 * | 3/2007 | Thomas ..................... 280/739 |
| 7,249,783 B2 | 7/2007 | Parkinson et al. |
| 7,261,320 B2 | 8/2007 | Fredin et al. |
| 7,275,763 B2 | 10/2007 | Thomas et al. |
| 7,354,064 B2 * | 4/2008 | Block et al. ............... 280/743.2 |
| 7,374,205 B2 | 5/2008 | Thomas |
| 7,377,548 B2 | 5/2008 | Bauer et al. |
| 7,552,942 B2 * | 6/2009 | Fischer et al. ............ 280/743.2 |
| 7,954,850 B2 * | 6/2011 | Fischer et al. ............ 280/743.1 |
| 2002/0036400 A1 * | 3/2002 | Winters et al. ............ 280/743.2 |
| 2002/0096871 A1 * | 7/2002 | Pinsenschaum et al. .. 280/743.2 |
| 2002/0125706 A1 * | 9/2002 | Greib et al. ............... 280/743.2 |
| 2004/0046376 A1 * | 3/2004 | Ryan ......................... 280/743.2 |
| 2005/0127653 A1 * | 6/2005 | Williams et al. ........... 280/743.2 |
| 2008/0246261 A1 | 10/2008 | Webber et al. |
| 2009/0206587 A1 | 8/2009 | Abe |
| 2009/0212538 A1 | 8/2009 | Abe et al. |
| 2010/0140910 A1 * | 6/2010 | Fischer et al. ............. 280/743.2 |
| 2010/0201107 A1 * | 8/2010 | Abe et al. .................. 280/730.1 |
| 2011/0031723 A1 * | 2/2011 | Fischer et al. ............. 280/730.1 |
| 2011/0101652 A1 * | 5/2011 | Abe ........................... 280/728.3 |
| 2011/0140401 A1 * | 6/2011 | Fischer et al. ............. 280/743.1 |
| 2011/0198828 A1 * | 8/2011 | Fischer et al. ............. 280/743.2 |
| 2012/0074677 A1 * | 3/2012 | Hiruta et al. ................ 280/739 |
| 2012/0153603 A1 * | 6/2012 | Mallinger et al. ........... 280/739 |

* cited by examiner

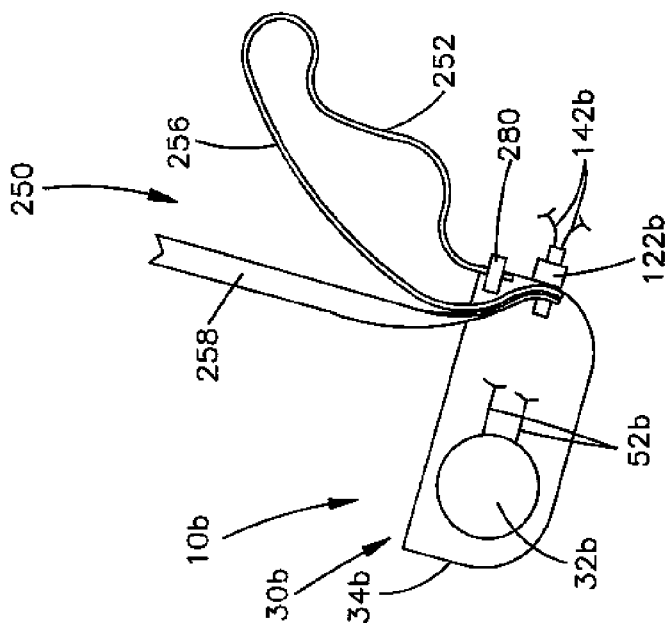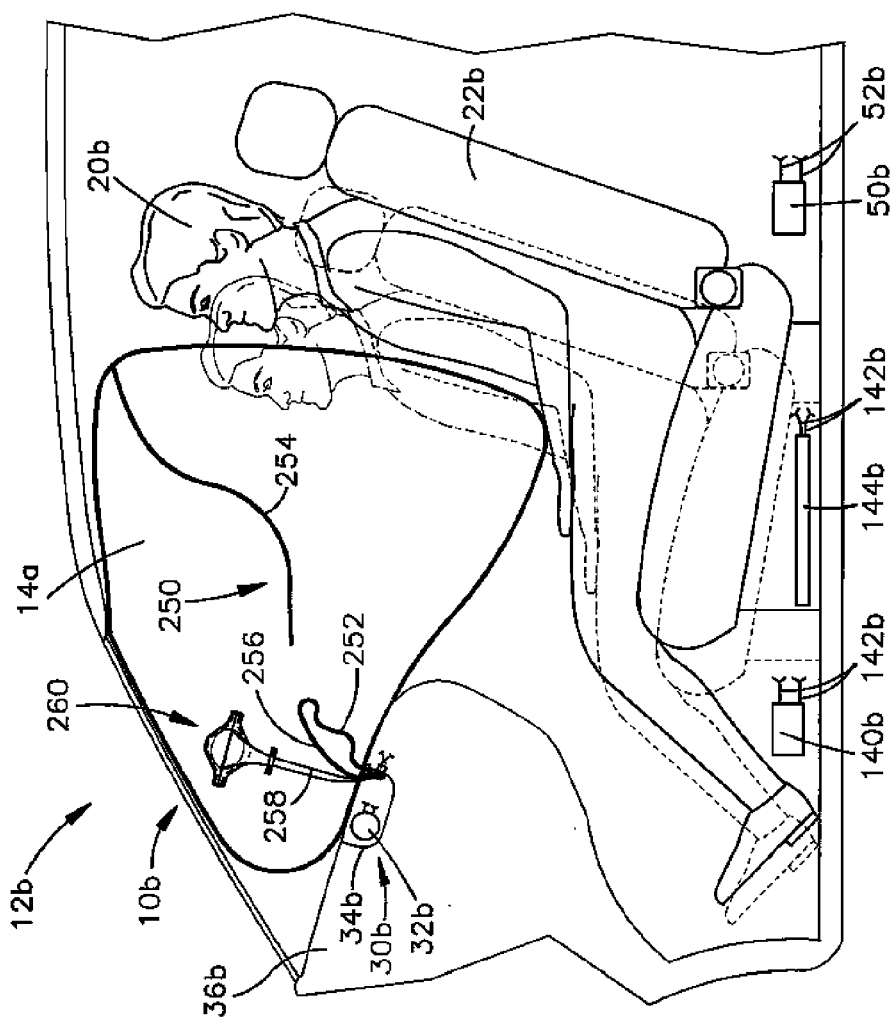

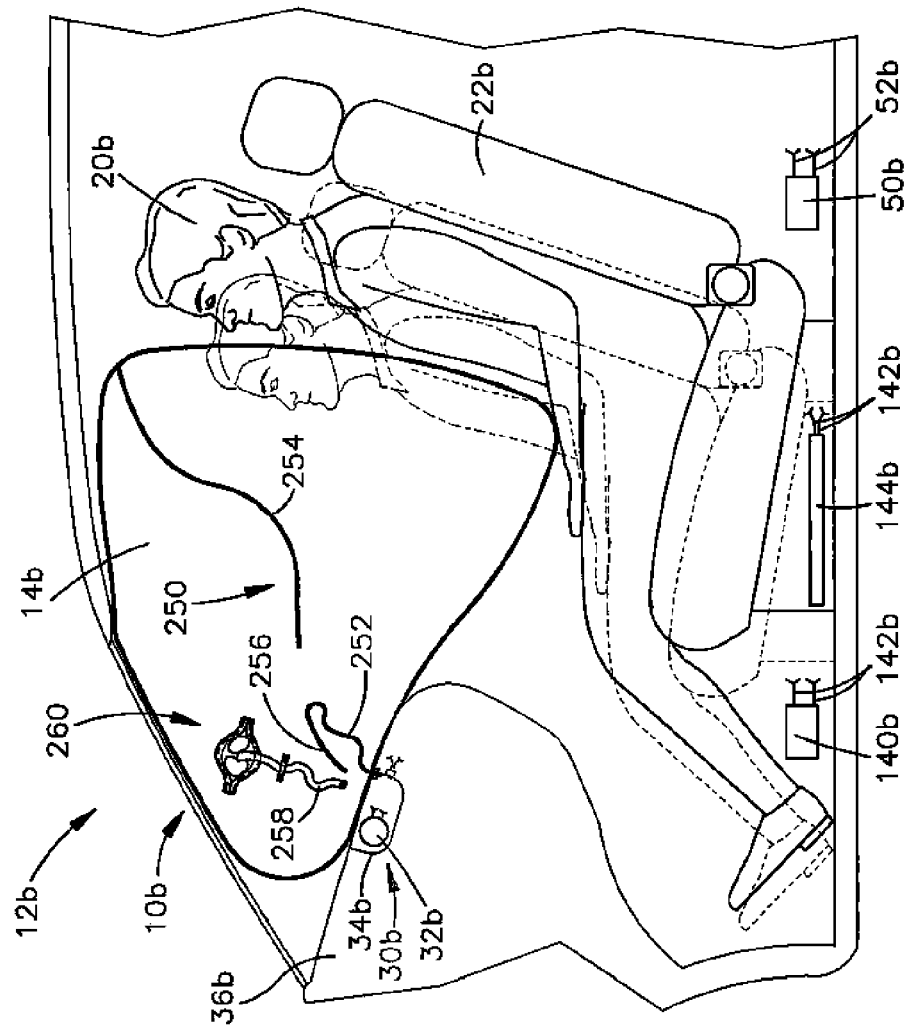
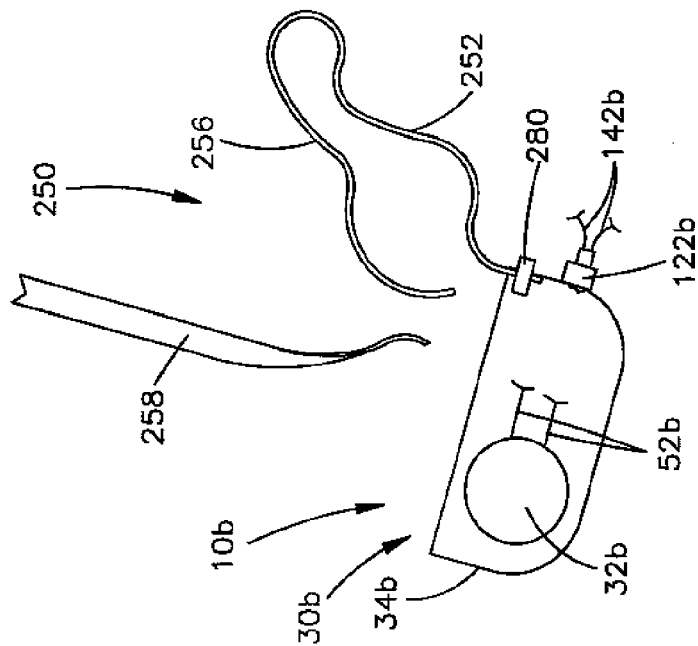
Fig.11
Fig.11B

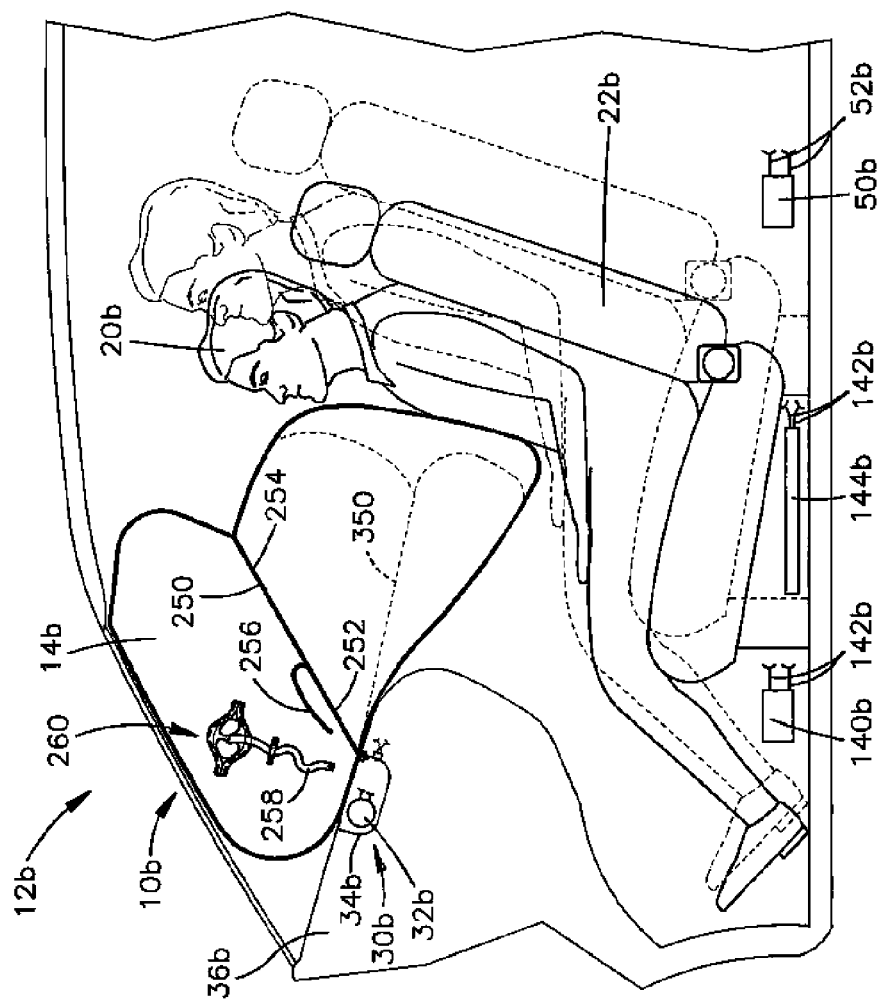
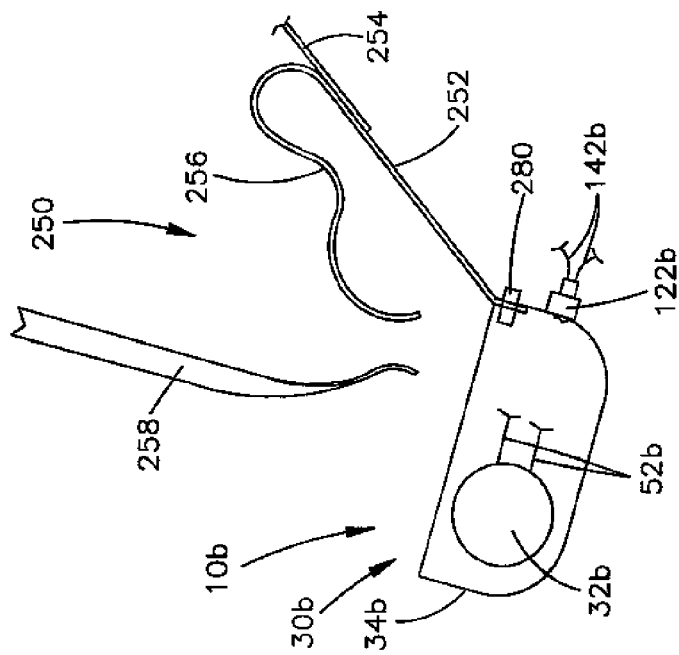
Fig.12A
Fig.12B

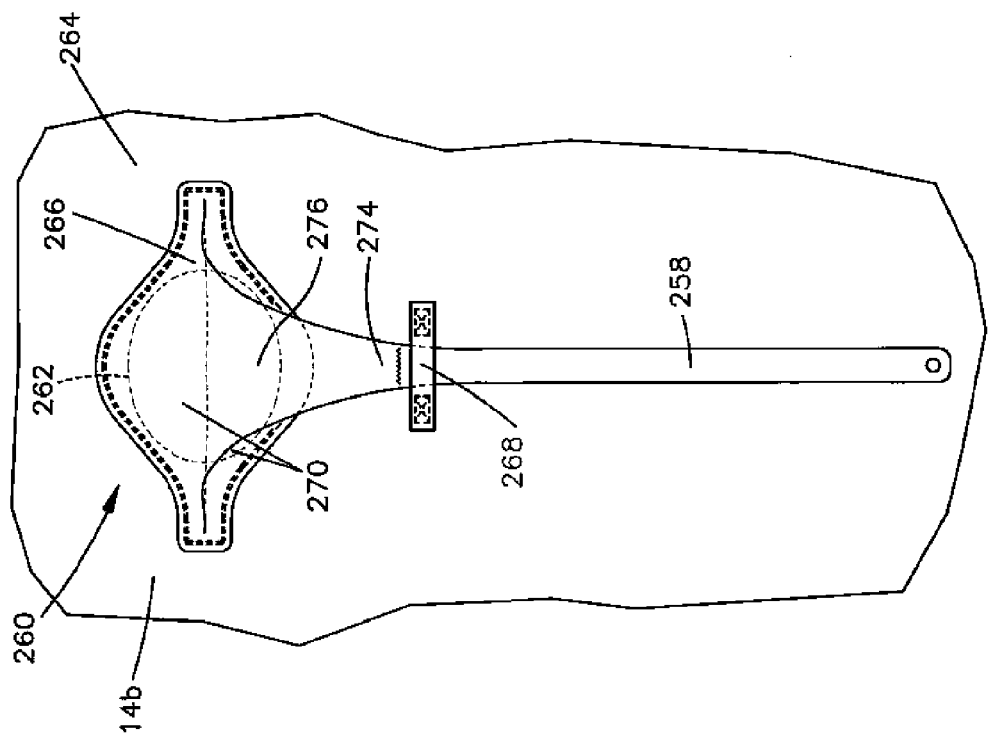
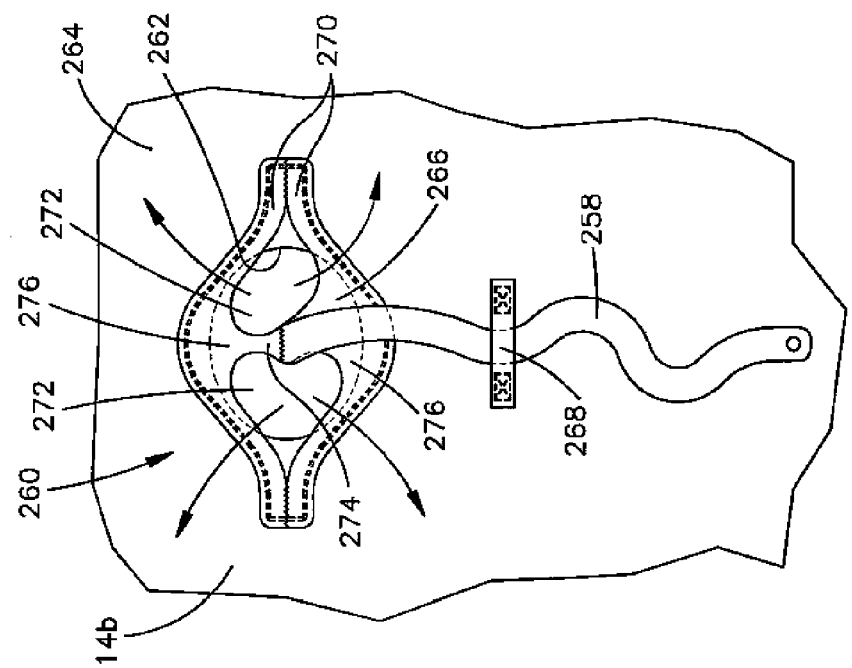

US 8,419,058 B2

DUAL VOLUME AIR BAG

RELATED APPLICATIONS

This application is a Continuation-in-Part of U.S. application Ser. No. 12/077,826, which was filed on Mar. 21, 2008.

FIELD OF THE INVENTION

The present invention relates to an apparatus for helping to protect an occupant of a vehicle. More particularly, the present invention relates to an air bag inflatable between an instrument panel and a front seat occupant of a vehicle.

BACKGROUND OF THE INVENTION

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Such air bags may be driver air bags or passenger air bags. When inflated, the driver and passenger air bags help protect the occupant from impacts with parts of the vehicle such as the instrument panel and/or a steering wheel of the vehicle.

Passenger air bags are typically stored in a deflated condition in a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated position. The air bag door opens as a result of forces exerted on the door by the inflating air bag.

Driver air bags are typically stored in a deflated condition in a housing that is mounted on the vehicle steering wheel. An air bag cover is connectable with the housing and/or steering wheel to help enclose and conceal the air bag in a stored condition. Upon deployment of the driver air bag, the air bag cover opens to permit the air bag to move to an inflated position. The air bag cover opens as a result of forces exerted on the cover by the inflating driver air bag.

SUMMARY OF THE INVENTION

The present invention relates to an air bag module that includes an air bag having a deflated condition and an inflated condition and a structure for supporting the air bag. A first tether has a first end connected to the structure via an actuatable fastener and an opposite second end connected to the air bag. A second tether having a first end secured to the first tether by a releasable connection at a location between the first and second ends of the first tether. The second tether has a second end connected to a deployable portion of the air bag.

The present invention also relates to an apparatus for helping to protect an occupant of a vehicle. The apparatus includes an inflatable vehicle occupant protection device having a deflated condition and an inflated condition. A first tether has a first segment comprising an anchor tether that is secured to the vehicle and a second segment comprising a trigger tether. A second tether includes a shaping tether secured to a portion of the protection device. A releasable connection connects the second tether to the first tether at a location on the first tether where the segments meet. An actuatable device secures the trigger tether to the vehicle so that the trigger tether becomes tensioned by the shaping tether due to deployment of the protection device. The trigger tether, when tensioned, ruptures the releasable connection, which disconnects the shaping tether from the anchor tether and thereby permits the portion of the protection device to deploy uninhibited. The actuatable device is actuatable to release the trigger tether so that the releasable connection maintains the connection between the anchor tether and the shaping tether. The anchor tether and shaping tether in combination restrict deployment of the portion of the protection device.

The present invention further relates to an apparatus for helping to protect an occupant of a vehicle. The apparatus includes an inflatable vehicle occupant protection device having a deflated condition and an inflated condition. An adaptive tether selectively shapes the air bag and a vent selectively releases inflation fluid from the air bag. The vent includes a vent tether for actuating the vent. An actuatable device secures the adaptive tether and the vent tether to the vehicle. The actuatable device is selectively actuatable to place the protection device in one of three different inflated conditions.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIGS. 10-12 are schematic side views illustrating a fourth embodiment of an apparatus for helping to protect an occupant of a vehicle, illustrating the apparatus in different conditions, according to the present invention;

FIGS. 13 and 14 are schematic illustrations of a portion of the apparatus of FIGS. 10-12.

DETAILED DESCRIPTION OF THE INVENTION

Figure 1:
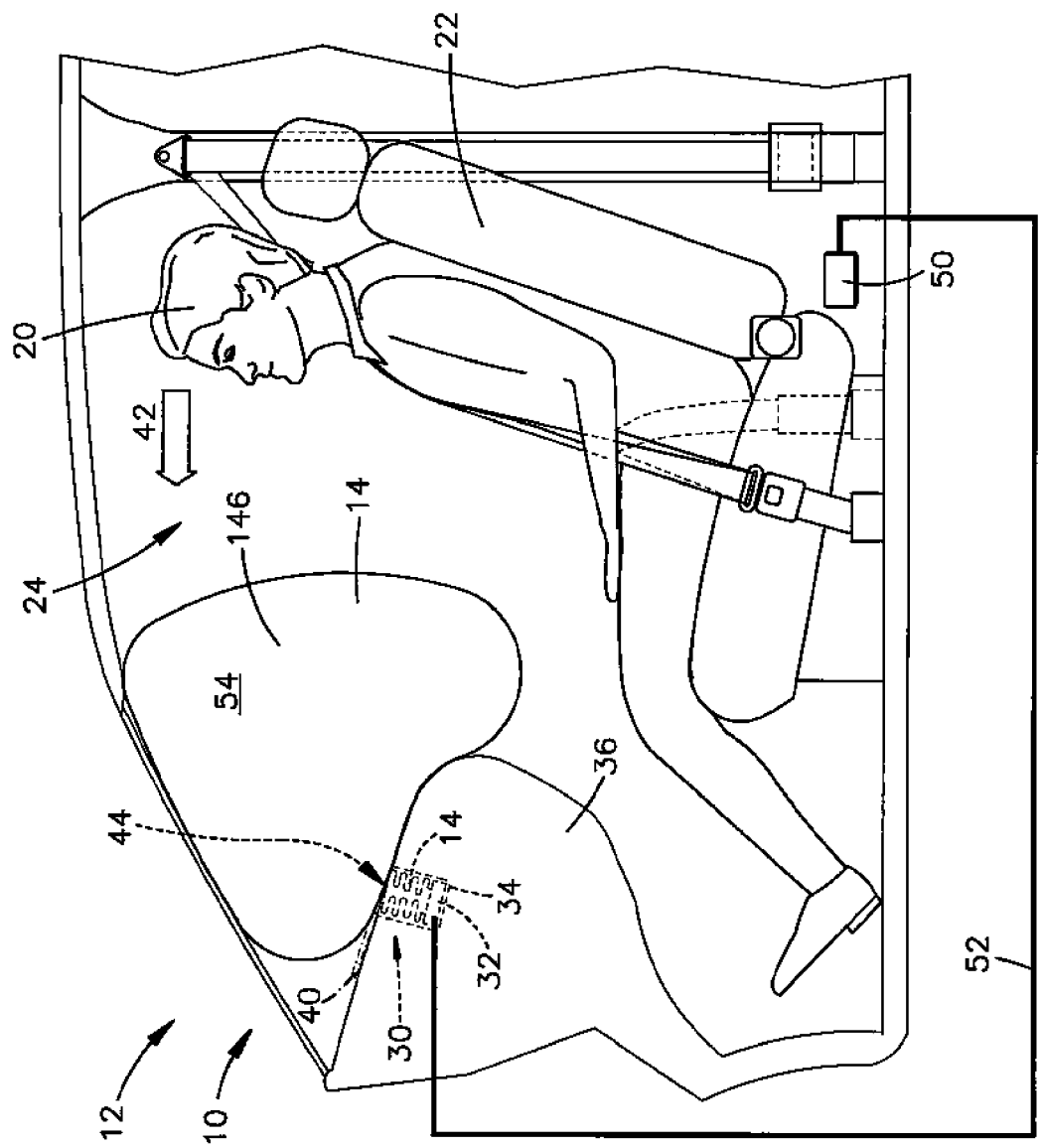
FIG. 1 is a schematic side view illustrating an apparatus for helping to protect an occupant of a vehicle.

An apparatus 10 for helping to protect an occupant 20 of a vehicle 12 includes an inflatable vehicle occupant protection device 14 in the form of an air bag. In the embodiment illustrated in FIG. 1, the air bag 14 is a passenger frontal air bag for helping to protect an occupant 20 of a seat 22 on a passenger side 24 of the vehicle 12.

The air bag 14 may be part of an air bag module 30 that includes an inflator 32 and a support or housing 34 for the air bag and inflator. The air bag 14 has a stored condition, indicated by dashed lines in FIG. 1, in which the air bag is folded and placed in the housing 34. The module 30 is mounted to a dash or instrument panel 36 of the vehicle 12. The housing 34 helps contain and support the air bag 14 and inflator 32 in the instrument panel 36.

An air bag door 40 is releasably connected to the instrument panel 36 and/or the housing 34. In a closed condition (not shown), the air bag door 40 forms a cover for the module 30 and helps enclose the air bag 14 in the stored condition in the housing 34. The door 40 is movable to an opened condition illustrated in FIG. 1 to uncover an opening 44 through which the air bag 14 may be deployed from the stored condition in the housing 34. The door 40 may be connected to the vehicle 12, e.g., the instrument panel 36, either directly or through the housing 34, by means (not shown), such as a plastic hinge portion, a strap, or a tether.

The inflator 32 is actuatable to provide inflation fluid to an inflatable volume 54 of the air bag 14 to deploy the air bag to the inflated condition. The inflator 32 may be of any known type, such as stored gas, solid propellant, augmented, or hybrid. The apparatus 10 also includes a sensor/controller, illustrated schematically at 50, for sensing an event for which inflation of the air bag 14 is desired, such as a collision, and providing an actuation signal to the apparatus 10 in response to the sensed event. The inflator 32 is operatively connected to the sensor/controller 50 via lead wires 52.

The air bag 14 can be constructed of any suitable material, such as nylon (e.g., woven nylon 6-6 yarns), and may be constructed in any suitable manner. For example, the air bag 14 may include one or more pieces or panels of material. If more than one piece or panel is used, the pieces or panels may be interconnected by known means, such as stitching, ultrasonic welding, heat bonding, or adhesives, to form the air bag. The air bag 14 may be uncoated, coated with a material, such as a gas impermeable urethane, or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

Upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 54 of the air bag 14 in a known manner. The inflating air bag 14 exerts a force on the door 40, which moves the door to the opened condition. The air bag 14 inflates from the stored condition to a deployed condition, such as the fully inflated and deployed condition illustrated in solid lines in FIG. 1. The air bag 14, while inflated, helps protect the vehicle occupant 20 from impacts with parts of the vehicle 12, such as the instrument panel 36.

The air bag 14 may have one or more actuatable features for helping to control or tailor inflation of the air bag in response to vehicle conditions, occupant conditions, or both. These features may be actuatable actively, for example, in response to conditions determined via active sensors, or passively, for example, having a configuration responsive to physical conditions at the time of inflation and deployment. Examples of such actuatable features are illustrated in FIGS. 2-5.

Referring to FIGS. 2-5, the air bag 14 includes an adaptive tether 100 for adapting the configuration of the air bag 14 depending on vehicle conditions, occupant conditions, or a combination of vehicle and occupant conditions at the time of the occurrence of the event for which inflation and deployment of the air bag is triggered. The adaptive tether 100 is a three-leg tether that includes a portion comprising an anchor tether 102, a portion comprising a shaping tether 104, and a portion comprising a trigger tether 106. In this configuration, the anchor tether 102 and trigger tether 106 are segments of a first length of tether material, and the shaping tether 104 is its own separate second length of tether material.

The anchor tether 102 has a first end portion 110 anchored to the vehicle. Anchoring the anchor tether 102 to the vehicle 12 could be achieved in a many different manners. The anchor tether 102 could, for example, be secured to the air bag 14 (e.g., a rear panel of the air bag) or to structure of the vehicle 12, such as the air bag module 30 (e.g., the housing 34) or the instrument panel 36. In the embodiment illustrated in FIGS. 2-5, the anchor tether is secured to the air bag 14 at a location near a mouth portion 90 of the air bag where the bag is secured to the housing 34.

The shaping tether 104 has a first end portion 112 secured to a panel, such as a front panel 114, of the air bag 14. This connection can be established by known means, such as stitching or ultrasonic welding. In the embodiment illustrated in FIGS. 2-5, the first end portion 112 of the shaping tether 104 is connected to an upper portion 116 of the front panel 114 of the air bag 14. Those skilled in the art will appreciate that the shaping tether 104 could be connected to the air bag 14 at a different location.

The trigger tether 106 has a first end portion 120 secured to a support structure in the vehicle 12, such as the housing 34, by an actuatable device 122. The actuatable device 122 may, for example, be an actuatable fastener, such as a pyrotechnic bolt, that is actuatable to break or release the connection of the first end portion 120 of the trigger tether 106 to the housing 34. Those skilled in the art will appreciate that alternative devices 122 could be utilized in this application. For example, the actuatable device may comprise an actuatable latch, a solenoid mechanism, or actuatable cutters or shears.

Figure 4:
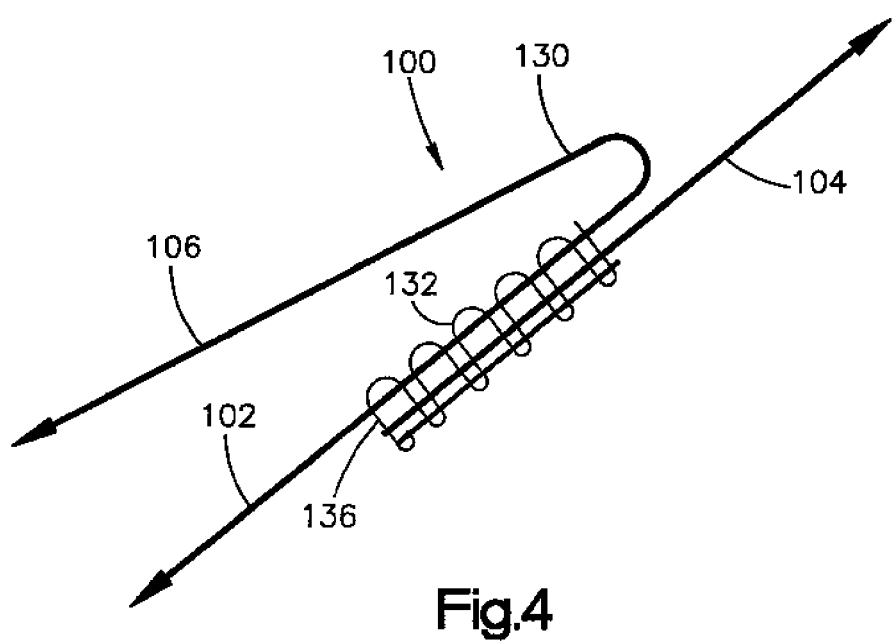
FIGS. 4 and 5 are schematic illustrations of a portion of the apparatus of FIGS. 2 and 3.

In an unactuated condition of the adaptive tether 100, the anchor tether 102, shaping tether 104, and trigger tether 106 are interconnected. This is shown in detail in FIGS. 4 and 5. As shown in FIG. 4, the anchor tether 102 and trigger tether 106 are segments of a single length of tether material 130. The shaping tether 104 is a separate length of tether material. A releasable connection 132 interconnects the shaping tether 104 to the tether material 130 at or near the interface between the anchor tether 102 and trigger tether 106. In the illustrated embodiment, the releasable connection 132 comprises releasable tear stitching. The releasable connection 132 could, however, have alternative connection or construction. For example, the releasable connection 132 could comprise a releasable bonding agent, such as an adhesive or tape, or a releasable mechanical device, such as a rivet or staple.

Figure 5:
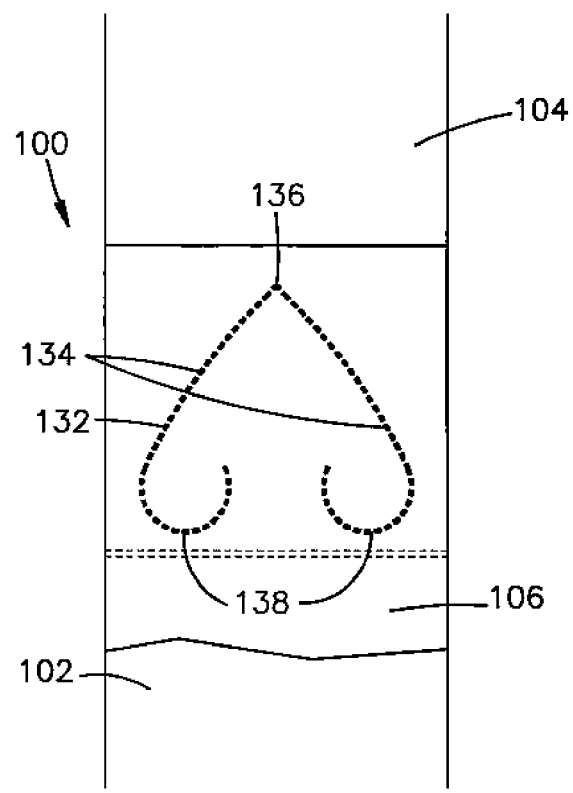

According to the present invention, a rupturable tear stitch configuration that promotes predictability, repeatability, and reliability in releasing interconnected fabrics is used to form the tear stitching 132. FIGS. 4 and 5 illustrate by way of example tear stitching 132 in accordance with the present invention. Referring to FIGS. 4 and 5, the tear stitching 132 has an inverted V-shaped configuration with outwardly diverging segments 134 or legs that meet at a break point 136. Terminal end portions 138 of the segments 134 have an inwardly curved configuration that terminates short of intersecting its associated segment.

The tear stitching 132 is configured to rupture in response to the tension applied to the shaping tether 104 and the trigger tether 106 during deployment of the air bag 14. According to the present invention, the tear stitching 132 is adapted to release the connection between the anchor tether 102 and the shaping tethers 104 depending on conditions in the vehicle 12 when the air bag 14 is deployed.

The air bag 14 and adaptive tether 100 are constructed and arranged such that the amount of tension sufficient to rupture the tear stitching differs between the shaping tether 104 and trigger tether 106. Tension applied to the tear stitching 132 by the shaping tether 104 acts generally parallel to the anchor tether 102. This helps distribute the tension force over the end portions 138 and segments 134 of the tear stitching 132. The tear stitching 132 may thus offer a relatively high resistance to rupture in response to tension applied by the shaping tether 104 and anchor tether 102 (referred to herein as "shaping strength").

Tension applied to the tear stitching 132 by the shaping tether 204 and trigger tether 106 acts at an angle to the anchor tether 102 (see FIG. 4) and thus produces a "peeling" force or action between the trigger tether 106 and the shaping tether 104. This peeling action helps focus the tension on the break point 136 of the tear stitching 132. Peeling force depends on pulling the trigger tether 106 back along the stitching 132 and the stitched portion of the anchor tether 102. Ideally, tension pulling the trigger tether 106 parallel to the anchor tether 102 and the plane of the stitching 132 produces a pulling force that is the strongest and the most focused on the break point 136. Tension pulling the trigger tether 106 substantially in this direction, as shown for example in FIG. 4, can provide a peeling force that is sufficiently strong and focused.

Due to the strength and focusing properties of the peeling force applied by the trigger tether 106, the tear stitching 132 may thus offer a relatively lower resistance rupture in response to tension applied by the shaping tether 104 and trigger tether 106 (referred to herein as "trigger strength"). The adaptive tether 100 thus may have a relatively high shaping strength and a correspondingly low trigger strength.

Because of this, the rupture strength of the tear stitching 132 may be selected to have a desired combination of shaping and trigger strengths. This can be achieved, for example, through the careful selection of the thread material, stitch pattern, number of stitches, and/or thread pattern. For instance, in one embodiment, the tear stitching 132 may have a trigger strength selected such that the tear stitching ruptures in response to a force of about 100 Newtons applied via the shaping tether 104 and trigger tether 106. In contrast, this same tear stitching 132 may also have a shaping strength selected such that the tear stitching is capable of withstanding a force of about 2000 Newtons applied via the shaping tether 104 and anchor tether 102.

According to the present invention, the segment of the tether 130 forming the trigger tether 106 has a length that is shorter than the length of the segment of the tether forming the anchor tether 102. Due to this configuration, those skilled in the art will appreciate that, in response to deployment of the air bag 14, tension will be applied to the tear stitching 132 by the trigger tether 106 and the shaping tether 104. This is the case, of course, as long as the connection between the trigger tether 106 and the housing 34 is maintained by the actuatable fastener 122.

If the actuatable fastener 122 remains unactuated and maintains the connection of the trigger tether 106 to the housing 34, then tension is applied to the tear stitching 132 by the shaping tether 104 and trigger tether 106, due to the trigger tether being shorter than the anchor tether 102. As a result, the peeling action focuses the tension on the break point 136. When the tension on the trigger tether 106 exceeds the trigger strength, the tear stitching 132 ruptures beginning at the break point 136. The rupture then travels along the curved segments 134 until the trigger tether 106 and shaping tether 104 are released from each other.

If the actuatable fastener 122 is actuated and releases the connection of the trigger tether 106 to the housing 34, then tension is applied to the tear stitching 132 by the shaping tether 104 and anchor tether 102, since the trigger tether 106 is no longer anchored to the vehicle. As a result, the connection between the shaping tether 104 and anchor tether 102 relies on the shaping strength of the tear stitching 132. The shaping strength of the tear stitching 132 may preferably be configured to withstand the force of inflation and deployment of the air bag 14. As a result, the shaping tether 104 and anchor tether 102 combine to restrict deployment of the air bag 14, particularly the front panel 114, and thereby restrict or limit the air bag 14 to the desired shape.

The shaping strength and trigger strength of the tear stitching 132 can be tailored to desired values through a variety of configurable characteristics. For example, the material used to construct the tear stitching 132 may be selected to have material properties that help provide the desired shaping and tear strengths. Also, stitching itself (i.e., stitches per inch, type of stitch) may be selected to have material properties that help provide the desired shaping and tear strengths. Further, the shape of the tear stitching 132 may differ from the V-shaped configurations illustrated in FIGS. 4 and 5 and may be selected to have material properties that help provide the desired shaping and tear strengths.

When an event occurs which inflation of the air bag 14 is desired, the adaptive tether 100 respond to vehicle conditions, occupant conditions, or both to help control inflation and deployment of the air bag. According to the embodiment of FIGS. 2-5, this control is implemented actively based on sensed conditions in the vehicle 12. To achieve this function, the apparatus 10 also includes a controller, illustrated schematically at 140, for actuating the actuatable fastener 122. The controller 140 is operatively connected to the actuatable fastener 122 via lead wires 142. Upon the occurrence of an event for which inflation of the air bag 14 is desired, such as a collision, the controller 140 determines whether to actuate the actuatable fastener based on vehicle conditions, occupant conditions or both vehicle and occupant conditions at the time of the sensed event.

Figure 2:
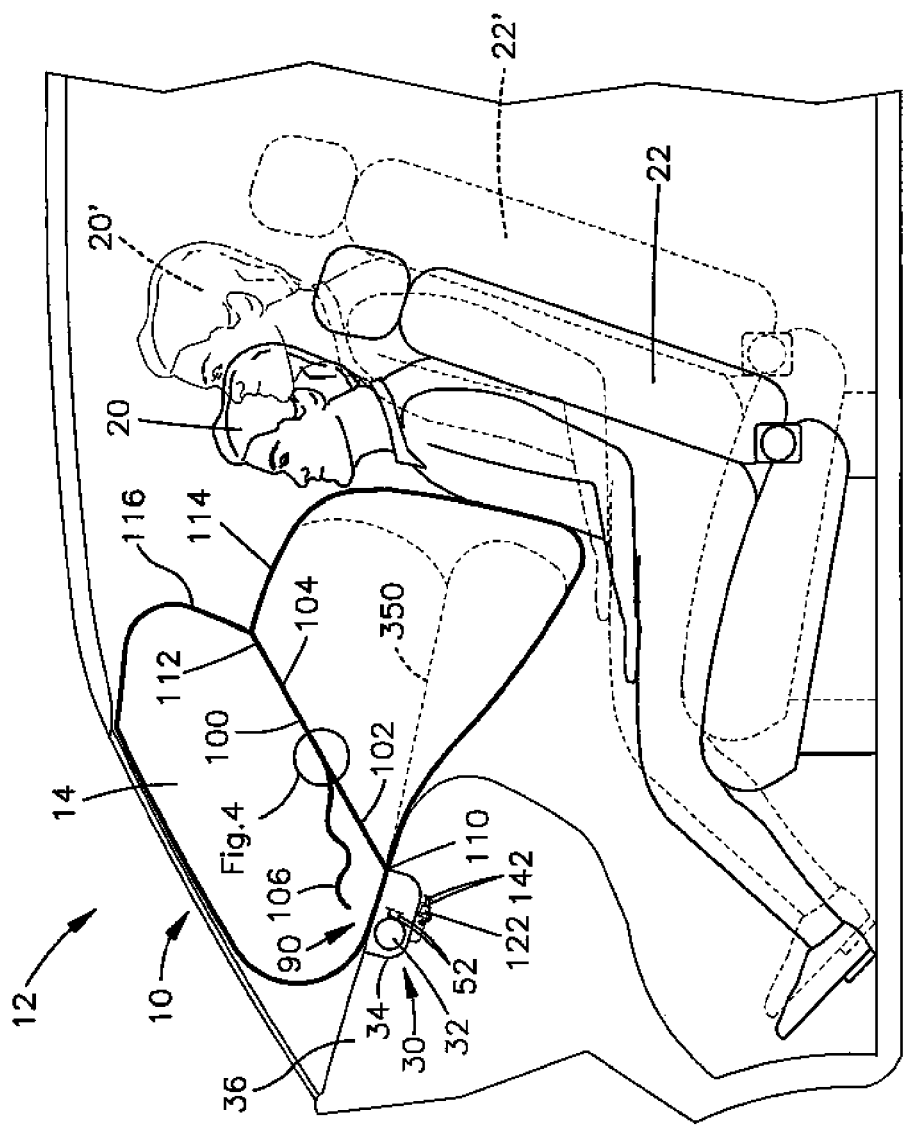
FIGS. 2 and 3 are schematic side views illustrating a first embodiment of an apparatus for helping to protect an occupant of a vehicle, illustrating the apparatus in different conditions, according to the present invention.
Figure 3:
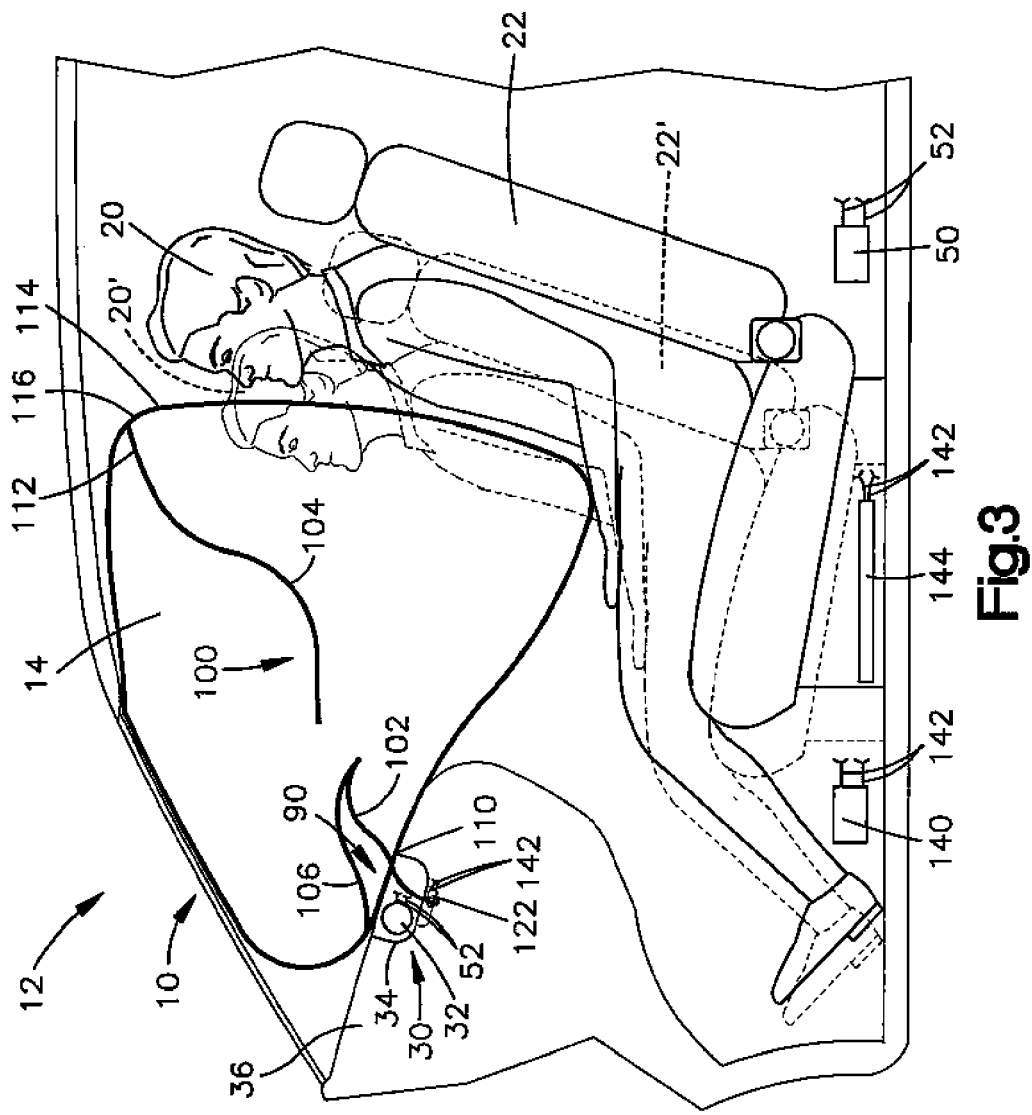

The controller 140 is also operatively connected to sensors that provide signals that the controller can use to infer or determine the vehicle/occupant conditions. For example, as shown in FIGS. 2 and 3, the apparatus 10 may include one or more sensors 144 that can provide a signal to the controller 140 via lead wires 142 that is indicative of a sensed seat position, a sensed weight on the vehicle seat 22, a sensed presence of an occupant 20 on the vehicle seat, or a combination of these conditions. Through the controller 140 and sensors 144, the apparatus 10 may, for example, be adapted to respond to the size or position of the vehicle occupant 20.

Referring to FIG. 2, the occupant 20 is positioned relatively close to the instrument panel 36 and therefore relatively dose to the air bag module 30. This may be the case, for example, with a relatively small occupant, such as a child or small female occupant. For reference, a large occupant 20' such as an average size or large adult male is illustrated in dashed lines. Those skilled in the art will appreciate that the smaller occupant 20 may adjust the vehicle seat 22 to a position forward of the seat 22' of the larger occupant 20'. The smaller occupant 20 may also place less weight on the vehicle seat 22.

According to the present invention, upon sensing the forward positioned occupant 20 and in response to sending the event for which occupant protection is desired, the controller 140 actuates the actuatable fastener 122, which disconnects the trigger tether 106 from being connected/anchored to the housing 34. As a result, the trigger tether 106 does not apply any tension or force on the tear stitching 132 (see FIGS. 4 and 5). Because of this, the shaping tether 104 and anchor tether 102 become tensioned by the deploying front panel 114 of the air bag 14. When this occurs, the tension in the shaping tether 104 and anchor tether 102 is applied to the tear stitching 132, which connects the two tethers.

Since, as described above, the tear stitching 132 has a relatively high shaping strength configured to withstand relatively high tension forces between the shaping tether 104 and the anchor tether 102, the tear stitching does not rupture in the event of the forward positioned occupant of FIG. 2. The shaping tether 104 thus helps maintain the shape of the air bag illustrated in FIG. 2. Those having skill in the art will appreciate that the shaping tether 104 helps maintain the upper portion 116 of the front panel 114 positioned away from the forward positioned occupant's head.

Referring to FIG. 3, the occupant 20 is positioned away from the instrument panel 36 and therefore relatively far from to the air bag module 30. This may be the case, for example, with a relatively large occupant, such as an adult male occupant. For reference, a small occupant 20' such as a child or small female occupant in a forward seat position is illustrated in dashed lines. Those skilled in the art will appreciate that the larger occupant 20 may adjust the vehicle seat 22 to a position rearward of the seat 22' of the smaller occupant 20'. The larger occupant 20 may also place more weight on the vehicle seat 22 than the small occupant 22.

According to the present invention, upon sensing the rearward positioned occupant 20 and sensing the occurrence of an event for which occupant protection is desired, the controller 140 blocks actuation of the actuatable fastener 122, which maintains the connection between the trigger tether 106 and the housing 34. As a result, the trigger tether 106 remains anchored in the vehicle 12 and therefore applies a tension or force on the tear stitching 132 (see FIGS. 4 and 5). Because of this, the trigger tether 106 becomes tensioned under the force of the deploying front panel 114 and the trigger tether 106 applies a significant tension or force on the tear stitching 132.

Since, as described above, the tear stitching 132 has a relatively low trigger strength configured to rupture under relatively low tension forces between the trigger tether 106 and the anchor tether 102, the tear stitching ruptures in the event of the rearward positioned occupant of FIG. 3. This releases the connection between the anchor tether 102 and the shaping tether 104. As a result, the shaping tether 104 does not maintain the shape of the air bag 14 and the air bag is permitted to inflate to the fully deployed position illustrated in FIG. 3.

In view of the above, those skilled in the art will appreciate that, according to the present invention, the adaptive tether 100 shapes or restricts deployment of the air bag 14 in the event of a forward positioned occupant and permits full deployment in the event of a rearward positioned occupant. Those skilled in the art will also appreciate that the adaptive function of the tether 100 is not limited to forward/rearward occupant position per se. For example, the adaptive tether 100 could function similarly to shape or restrict deployment of the air bag 14 in the event of a child safety seat positioned on the vehicle seat 22 as determined, for example, via a seatbelt tension sensor operatively connected to the controller 140. As another example, the adaptive tether 100 could function similarly to shape or restrict deployment of the air bag 14 in the event of an extremely large occupant, without regard to the forward/rearward position of the seat 22, based on the sensed weight on the seat. As a further example, the adaptive tether 100 could function similarly to shape or restrict deployment of the air bag 14 in the event of an occupant positioned away from a normal seating position, such as a leaned-over or leaned-forward position, without regard to the forward/rearward position of the seat 22 and without regard to the occupant's size, as determined by an occupant position sensor operatively connected to the controller 140. Additionally, while the adaptive tether 100 is illustrated as controlling the inflated depth of the air bag 14, the tether could be configured to control other dimensions, such as the inflated width or height, of the air bag 14.

Figure 6:
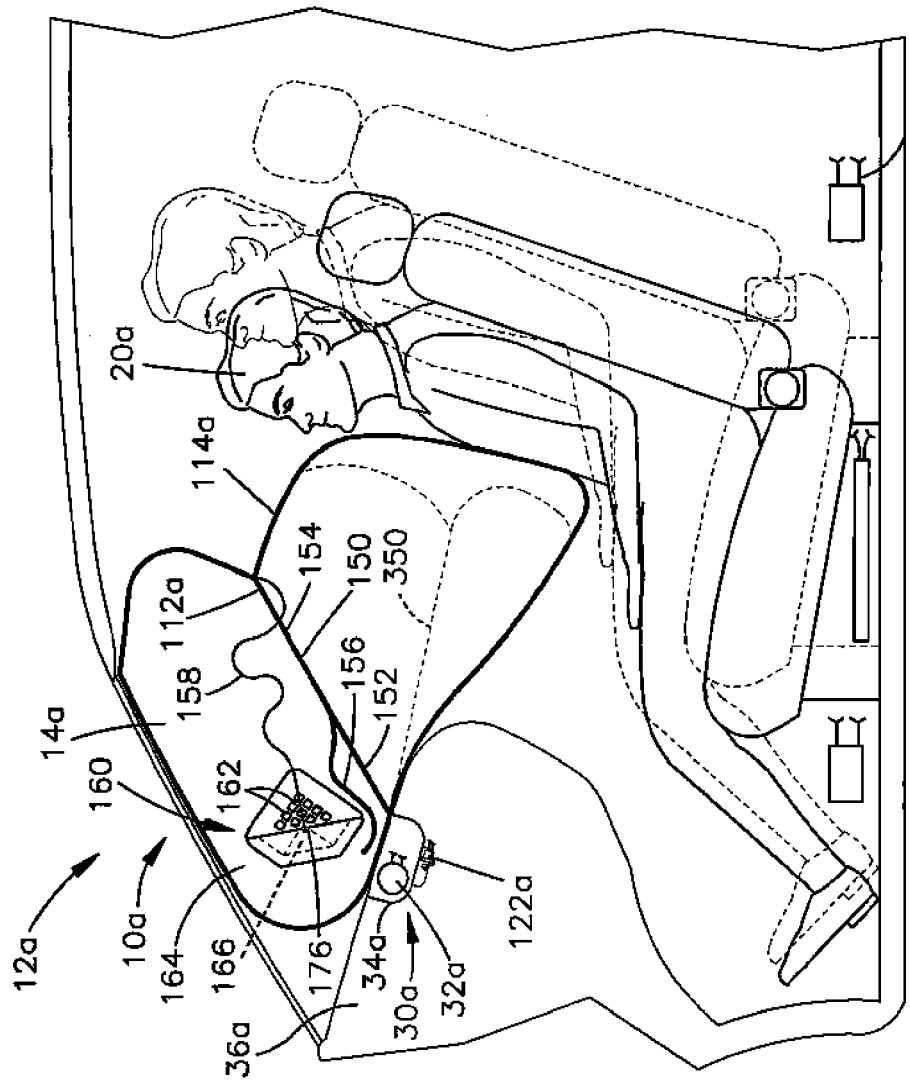
FIGS. 6 and 7 are schematic side views illustrating a second embodiment of an apparatus for helping to protect an occupant of a vehicle, illustrating the apparatus in different conditions, according to the present invention.
Figure 7:
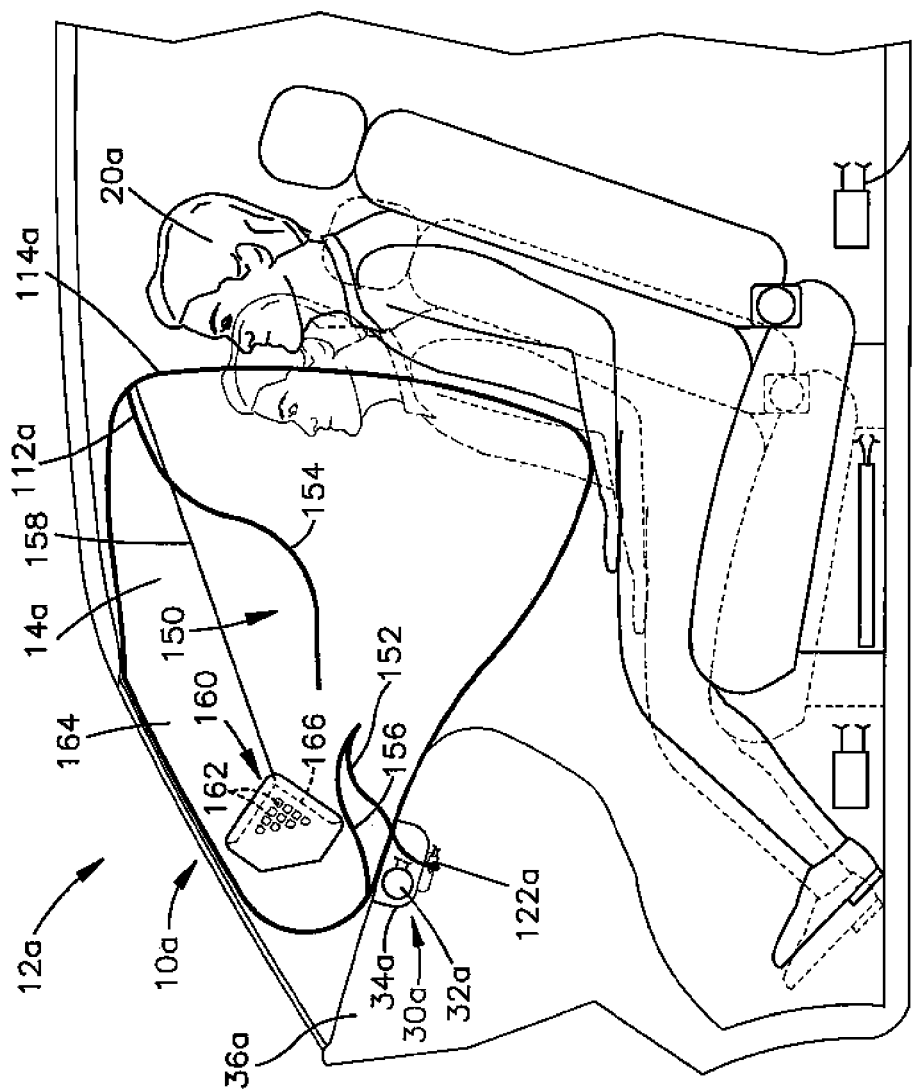

A second embodiment of the present invention is illustrated in FIGS. 6 and 7. Certain components in FIGS. 6 and 7 are similar or identical to components of FIGS. 2-5. The suffix "a" is added to the reference numbers of these similar or identical components in FIGS. 6 and 7 to avoid confusion. The apparatus 10a of the second embodiment includes an air bag module 30a comprising an air bag 14a, a housing 34a, and an inflator 32a.

In the embodiment of FIGS. 6 and 7, the apparatus 10a also includes an adaptive tether 150 that shapes the air bag 14a in the same manner as described above in regard to the apparatus of FIGS. 2-5. The adaptive tether 150 therefore includes a portion comprising an anchor tether 152, a portion comprising a shaping tether 154, and a portion comprising a trigger tether 156. Additionally, according to the embodiment of FIGS. 6 and 7, the air bag 14a also includes a vent 160 that is selectively actuatable to release inflation fluid from the inflatable volume of the air bag 14a. In this embodiment, the adaptive tether 150, in addition to the shaping functions, also comprises a vent tether 158 that is operative to actuate the vent 160 in response to vehicle and occupant conditions at the time the air bag is deployed. The vent 160 thus may selectively release inflation fluid from the air bag 14a depending on these conditions.

The vent 160 may have various configurations. In the embodiment illustrated in FIGS. 6 and 7, the vent 160 includes one or more vent openings 162 formed in a panel 164, such as a side panel, of the air bag 14a. A vent door 166 is secured to the side panel 164. The vent tether 158 has a first end portion secured to the vent door 166 and a second end portion secured to a panel of the air bag 14a, such as the front panel 114a of the air bag. The second end portion may be connected to the air bag 14a at a location at or near the location where the shaping tether 156 is connected to the air bag. For example, in the embodiment illustrated in FIGS. 6 and 7, the second end portion is connected to the front panel 114a at the same location where the shaping tether 156 is secured to the front panel 114a.

The vent door 166 is secured to the panel 164 by known means (not shown), such as stitching, ultrasonic welding, heat bonding, or adhesives. The vent 160 has an open condition (FIG. 6) in which the vent door 166 is positioned away from the vent openings 162 and thereby permits inflation fluid to vent, i.e., flow, through the vent openings. In the open condition, the vent door 166 is folded away from the vent openings 162 and held in place by a releasable tear stitch 176.

The air bag 14a, vent 160, and adaptive tether 150 are constructed and arranged to adapt to vehicle and occupant conditions in the vehicle 12a at the time the air bag is deployed. The anchor tether 152, shaping tether 154, trigger tether 156, and actuatable fastener 122a of the embodiment of FIGS. 6 and 7 are identical to those of the embodiment of FIGS. 2-5. Therefore, the adaptive tether 150 of the second embodiment is operative to shape or restrict deployment of the air bag 14a in the event of a forward positioned occupant and permits full deployment of the air bag in the event of a rearward positioned occupant. The adaptive tether 150 of the second embodiment achieves this function via operation of the anchor tether 152, shaping tether 154, trigger tether 156 and actuatable fastener 122a in a manner that is identical to the corresponding tethers and fastener shown in FIGS. 2-5 and described above.

The vent tether 158 is constructed and arranged to adapt to selectively actuate the vent 160 in response to vehicle and occupant conditions in the vehicle 12a at the time the air bag 14a is deployed. Since the vent tether 158 is connected to the vent door 166 and to the air bag 14a at a location at or near the location where the shaping tether 156 is secured to the air bag 14a, the vent tether can be adapted to respond to whether or not the shaping tether shapes the air bag. As described above, whether the shaping tether 156 shapes the air bag 14a depends on whether the actuatable fastener 122a releases the shaping tether from its connection with the housing 34a of the air bag module 30a. Therefore, whether the vent tether 158 actuates the vent 160 also depends on whether the actuatable fastener 122a releases the shaping tether from its connection with the housing 34a of the air bag module 30a.

Actuation of the actuatable fastener 122a depends on sensed vehicle and/or occupant conditions in the vehicle, as described above in regard to the embodiment of FIGS. 2-5. Essentially, the actuatable fastener 122a is actuated in response to a forward positioned occupant and remains unactuated in response to a rearward positioned occupant. Other factors, such as the presence of a child safety seat, an extremely large occupant, or an occupant positioned away from a normal seating position may also help to determine whether to actuate the fastener 122a. Therefore, actuation of the vent 160 is also dependent on these factors.

Referring to FIG. 6, the occupant 20a is a forward positioned occupant, such as a small female. In this event, the actuatable fastener 122a is actuated so that the trigger tether is released and the shaping tether 156 shapes the air bag 14a, restricting the front panel 114a from reaching the fully deployed condition. In doing so, this prevents the vent tether 158 from actuating the vent 160. Since, in the embodiment of FIGS. 6 and 7, the vent 160 has a normally open configuration, its non-actuation results in the vent remaining open. Therefore, in the case of the forward positioned small occupant 20a, the vent 160 vents inflation fluid from the air bag 14a.

Referring to FIG. 7, the occupant 20a is a rearward positioned occupant, such as a large male. In this event, the actuatable fastener 122a remains unactuated so that the trigger tether 156 releases the connection between the anchor tether 152 and the shaping tether 154. As a result, the front panel 114a is released to reach the fully deployed condition. In doing so, this also permits the vent tether 158 to actuate the vent 160. Since, in the embodiment of FIGS. 6 and 7, the vent 160 has a normally open configuration, its actuation results in the vent being placed in the closed condition. Therefore, in the case of the rearward positioned large occupant 20a, the vent 160 blocks inflation fluid venting from the air bag 14a.

In view of the above, those skilled in the art will appreciate that, according to the present invention, the adaptive tether 150 is configured cause inflation fluid venting in response to restricted deployment of the air bag 14a, and is configured to block inflation fluid venting in response to full deployment of the air bag. Those skilled in the art will appreciate that the adaptive tether 150 and vent 160 could be arranged such that the reverse is true, i.e., such that inflation fluid vents in response to full deployment and inflation fluid venting is blocked in response to restricted deployment. A vent configuration that could be used for this purpose is illustrated in FIGS. 8 and 9.

Additionally, those skilled in the art will appreciate that the vent 160 may provide an additional function for helping an occupant positioned away from the normal seating position. This may be the case, for example, where the large occupant 20a of FIG. 7 is positioned leaned forward adjacent to or near the instrument panel 36a. In this instance, even though the trigger tether 156 releases the shaping tether 154, the leaned forward occupant 20a may impede deployment of the air bag 14a. As a result, the occupant 20a may also prevent the air bag from tensioning the vent tether 158 and actuating the vent 160. Thus, in the case of this out of position occupant, the air bag 14a is adapted to vent inflation fluid via the vent 160 even though the trigger tether 156 releases the shaping tether 154.

Figure 8:
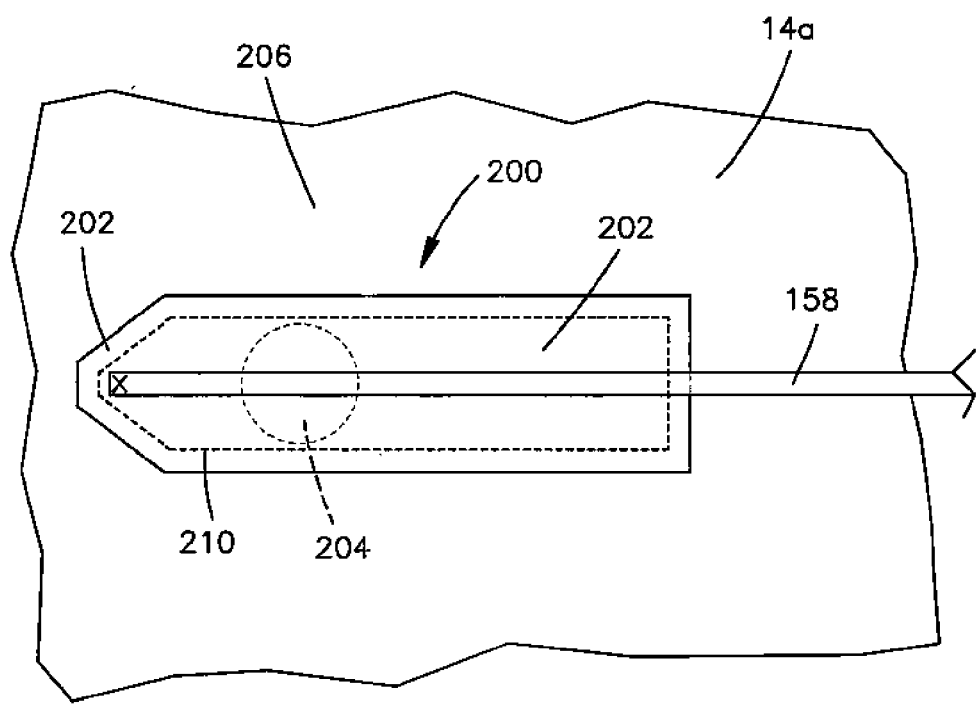
FIGS. 8 and 9 are schematic illustrations of a portion of the apparatus of FIGS. 6 and 7, according to a third embodiment of the present invention.
Figure 9:
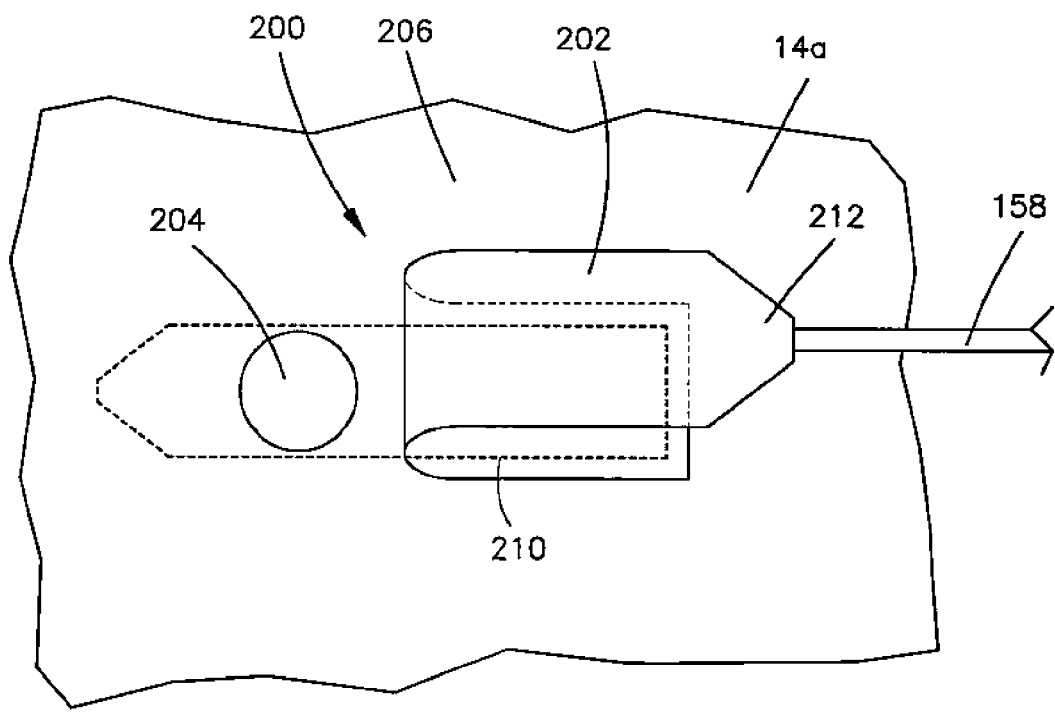

Referring to FIGS. 8 and 9, according to a third embodiment of the invention, a vent 200 for venting inflation fluid from the air bag 14a comprises a vent door 202 and a vent opening 204 in a panel 206 of the air bag, such as a side panel. The vent door 202 is secured to the panel 206 by a releasable connection 210, such as tear stitching or an adhesive. In the embodiment of FIGS. 8 and 9, the vent door 202 is secured to the panel 206 by tear stitching 210. The portion of the adaptive tether 150 comprising the vent tether 158 is secured to a tapered end portion 212 of the vent door 202 and extends along the vent door across the vent opening 204 to its connection (not shown) with the air bag 14a. The connection of the vent tether 158 with the air bag 14a may be similar or identical to that shown and described in the embodiment of FIGS. 6 and 7.

The vent 200 of FIGS. 8 and 9 has a normally closed construction. Therefore, when the occupant is a forward positioned occupant and the actuatable fastener is actuated so as to shape the bag as described above in regard to FIGS. 2-7, the vent tether 158 is prevented from actuating the vent 200. Since, in the embodiment of FIGS. 8 and 9, the vent 200 has a normally closed configuration, its non-actuation results in the vent remaining closed. Therefore, in the case of the forward positioned small occupant, the vent 200 blocks inflation fluid from venting inflation fluid from the air bag 14a.

Referring to FIG. 9, when the occupant is a rearward positioned occupant and the actuatable fastener remains unactuated so as to permit the air bag 14a to fully inflate and deploy as described above in regard to FIGS. 2-7, the vent tether 158 actuates the vent 200. Since, in the embodiment of FIGS. 8 and 9, the vent 200 has a normally closed configuration, its actuation results in the vent being pulled open, as shown in FIG. 9. Therefore, in the case of the rearward positioned large occupant, the vent 200 vents inflation fluid from the air bag 14a.

In view of the above, those skilled in the art will appreciate that, according to the present invention, the adaptive tether 150 is configured to block inflation fluid venting in response to restricted deployment of the air bag 14a, and is configured to permit inflation fluid venting in response to full deployment of the air bag.

A fourth embodiment of the present invention is illustrated in FIGS. 10-15. Certain components in FIGS. 10-15 are similar or identical to components of FIGS. 2-9. The suffix "b" is added to the reference numbers of these similar or identical components in FIGS. 10-15 to avoid confusion. Referring to FIGS. 10-12, the apparatus 10b of the second embodiment includes an air bag module 30b comprising an air bag 14b, a housing 34b, and an inflator 32b.

In the embodiment of FIGS. 10-12, the apparatus 10b also includes an adaptive tether 250 that shapes the air bag 14b in a manner similar to that described above in regard to the apparatus of FIGS. 2-9. The adaptive tether 250 includes a portion comprising an anchor tether 252, a portion comprising a shaping tether 254, and a portion comprising a trigger tether 256. Additionally, according to the embodiment of FIGS. 10-12, the air bag 14b also includes a vent 260 that is selectively actuatable to release inflation fluid from the inflatable volume of the air bag 14b. In this embodiment, the adaptive tether 250, in addition to the shaping functions, also comprises a vent tether 258 that is operative to actuate the vent 260 in response to vehicle and occupant conditions at the time the air bag 14b is deployed. The vent 260 thus may selectively release inflation fluid from the air bag 14b depending on these conditions.

The vent 260 may have various configurations. In the embodiment illustrated in FIGS. 10-12, the vent 260 has the configuration illustrated in FIGS. 13 and 14. FIG. 13 illustrates the vent 260 in an open condition. FIG. 14 illustrates the vent 260 in a closed condition. The vent 260 includes one or more vent openings 262 formed in a panel 264, such as a side panel, of the air bag 14b. A vent door 266 is secured to the side panel 264 and covers the openings 262. The vent tether 258 has a first end portion secured to the vent door 266, and extends through a guide 268 that is secured to the air bag panel 264.

The vent door 266 is secured to the panel 264 by known means, such as stitching, ultrasonic welding, heat bonding, or adhesives. In the illustrated embodiment, the vent door 266 itself includes separate panels 270 of material that are secured to each other by known means, such as stitching, to give the vent door the illustrated configuration. Those skilled in the art will appreciate that the vent door 266 could have alternative single panel or multiple panel constructions.

The vent door 266 has one or more vent openings 272 formed therein. In the embodiment illustrated in FIGS. 13 and 14, the vent door 266 includes two vent openings 272. The vent tether 258 is secured to a strip 274 of material of the vent door 266 that is positioned between the vent openings 272. The strip 274 interconnects opposing cover flaps 276 of the vent door 266. The vent 260 has an open condition (FIG. 13) in which the vent tether 258 is relaxed or slacked, thereby permitting the cover flap portions 276 of the vent door 266 to bulge outwardly and assume a convex configuration. In this condition, the vent openings 272 are opened and thereby release inflation fluid (indicated by arrows) from the air bag 14b through the openings 262 and 272.

The vent 260 has a closed condition (FIG. 14) in which the vent tether 258 is tensioned and forced by the guide 268 to extend along the air bag panel 264. In this condition, the cover flap portions 276 of the vent door 266 are tensioned along the air bag panel 264. The shape and size of the cover flap portions 276 are configured such that, when tensioned along the air bag panel 264, they both close the vent openings 272 of the vent door 266 and cover the opening 262 in the air bag panel 264. In the closed condition of the vent 260, the vent door 266 thus blocks inflation fluid from exiting the air bag 14b.

The air bag 14b, vent 260, and adaptive tether 250 are constructed and arranged to adapt to vehicle and occupant conditions in the vehicle 12b at the time the air bag is deployed. The anchor tether 252, shaping tether 254, trigger tether 256, vent tether 258, and actuatable fastener 122b of the embodiment of FIGS. 10-14, in a manner similar to the embodiments of FIGS. 2-9, are operative to shape or restrict deployment of the air bag 14b in the event of a forward positioned occupant and permits full deployment of the air bag in the event of a rearward positioned occupant. The shaping function is achieved via the combination of the anchor tether 252, shaping tether 254, and trigger tether 256 in the manner described in regard to the embodiments of FIGS. 2-9, i.e., the air bag 14b is restricted or shaped if the trigger tether is released, and the air bag is released for full deployment if the trigger tether connection is maintained. Through the configuration of the adaptive tether 250 and vent 260 of the embodiment of FIGS. 10-14, however, the apparatus 10b is configured to provide three different responses to sensed occupant conditions.

As shown in FIGS. 10B, 11B, and 12B, the vent tether 258 and trigger tether 256 are connected to the housing 34b of the air bag module 30b via an actuatable fastener 122b. The anchor tether 252 is connected to the housing 34b via a fastener 280, such as a bolt, rivet, or stud. The anchor tether 252 could be connected to alternative structure, such as the mouth of the air bag 14b or to the instrument panel 36b.

The vent tether 258 is constructed and arranged to adapt to selectively actuate the vent 260 in response to vehicle and occupant conditions in the vehicle 12b at the time the air bag 14b is deployed. Since the vent tether 258 is connected to the vent door 266 and to the actuatable fastener 122b, the vent tether can be adapted to respond to whether or not the actuatable fastener is actuated. If the actuatable fastener 122b is actuated, the vent tether 258 is released and the vent 260 is thereby released to the open condition of FIG. 13. If the actuatable fastener 122b is not actuated, the vent tether 258 is tensioned and the vent 260 is maintained in the closed condition of FIG. 14.

Whether the shaping tether 256 shapes the air bag 14b depends on whether the actuatable fastener 122b releases the trigger tether 256 from its connection with the housing 34b. If the actuatable fastener 122b is actuated, the trigger tether 256 is released and the connection between the anchor tether 252 and the shaping tether 254 is maintained, thereby shaping the air bag 14b and restricting its deployment. If the actuatable fastener 122b is not actuated, the connection of the trigger tether 256 to the housing 34b is maintained and the trigger tether tears the stitching connecting the anchor and shaping tethers 252 and 254, thus releasing the air bag 14b for full deployment.

Actuation of the actuatable fastener 122b depends on sensed vehicle and/or occupant conditions in the vehicle. When an event occurs which inflation of the air bag 14b is desired, the adaptive tether 250 respond to vehicle conditions, occupant conditions, or both to help control inflation and deployment of the air bag. According to the embodiment of FIGS. 10-14, this control is implemented actively based on sensed conditions in the vehicle 12b. To achieve this function, the apparatus 10b includes a sensor 50b, connected to the inflator 32b via lead wires 52b, that actuates the inflator upon sensing the occurrence of an event for which inflation of the air bag 14b is desired. The apparatus 10b also includes a controller, illustrated schematically at 140b, for actuating the actuatable fastener 122b. The controller 140b is operatively connected to the actuatable fastener 122b via lead wires 142b. Upon the occurrence of an event for which inflation of the air bag 14b is desired, such as a collision, the controller 140b determines whether to actuate the actuatable fastener based on vehicle conditions, occupant conditions or both vehicle and occupant conditions at the time of the sensed event.

The controller 140b is also operatively connected to sensors that provide signals that the controller can use to infer or determine the vehicle/occupant conditions. For example, as shown in FIGS. 10-12, the apparatus 10b may include one or more sensors 144b that can provide a signal to the controller 140b via lead wires 142b that is indicative of a sensed seat position, a sensed weight on the vehicle seat 22b, a sensed presence of an occupant 20b on the vehicle seat, or a combination of these conditions. Through the controller 140b and sensors 144b, the apparatus 10b may, for example, be adapted to respond to the size or position of the vehicle occupant 20b.

Figure 15:
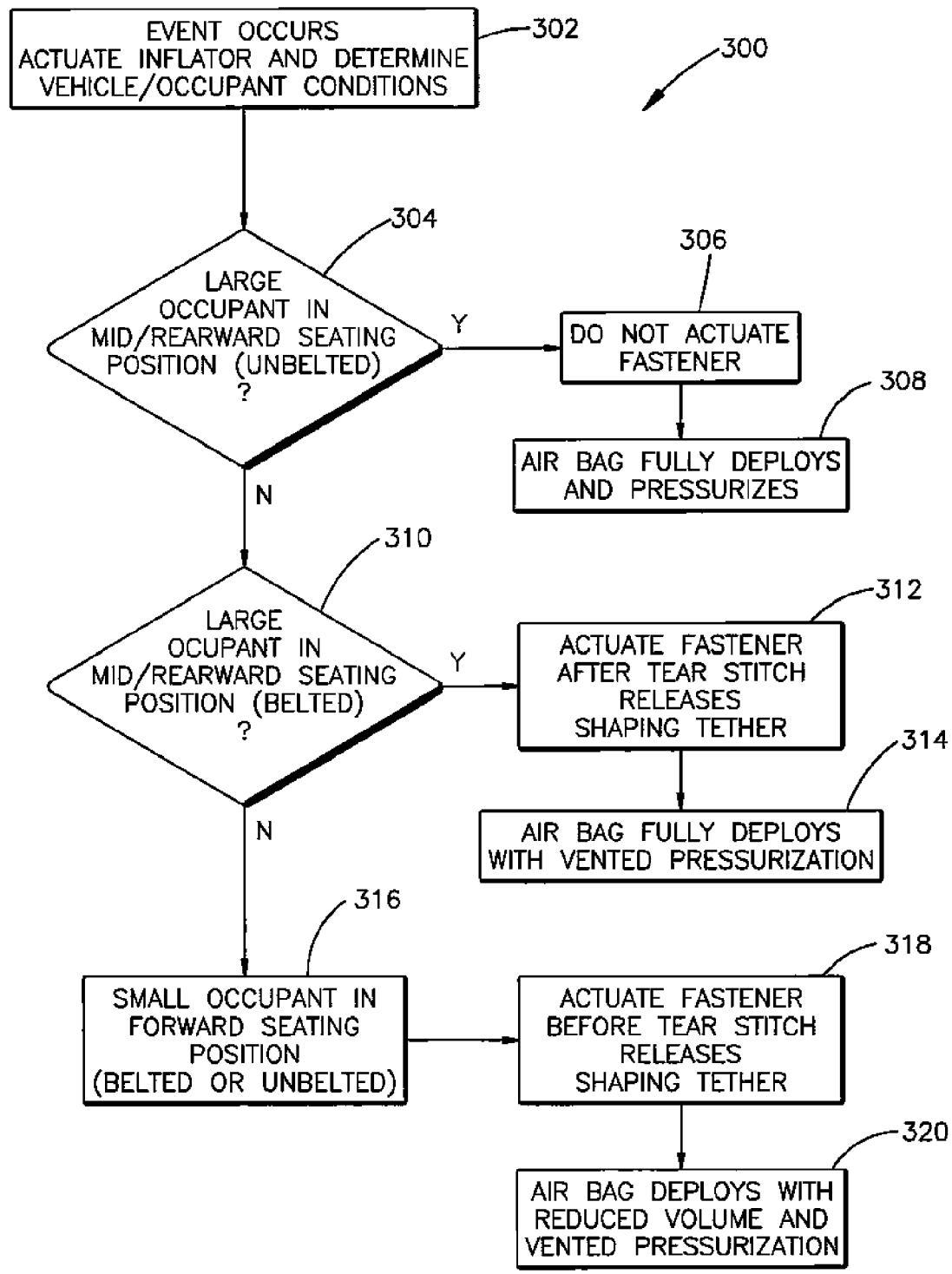
FIG. 15 is a block diagram illustrating the operation of the apparatus of FIGS. 10-14.

According to the embodiment of FIGS. 10-14, actuation of the actuatable fastener 122b, and the resulting conditions, are determined according to the process 300 illustrated in the block diagram of FIG. 15. Referring to FIG. 15, at block 302, an event occurs, which triggers actuation of the inflator 32b and a determination of vehicle and/or occupant conditions via the sensors 144*b* and controller 140*b*. At block 304, a determination is made as to the presence of a large unbelted occupant 22*b* in the vehicle seat 20*b*. This determination, made at least in part via the sensor(s) 144*b*, may include a seat position determination, a seat weight determination, an occupant presence determination, a seatbelt latched determination, or a combination of these determinations.

If, through the determinations at block 304, a large unbelted occupant in a mid/rearward seating position is determined, the process 300 proceeds to block 306, and the actuatable fastener 122*b* is not actuated. As a result, the trigger tether 256 releases the connection between the anchor tether 252 and the shaping tether 254. Also, the vent tether 258 pulls the vent 260 to the closed condition. As a result, the air bag 14*b* inflates to the fully deployed and pressurized (non-vented) condition of FIGS. 10A-B, as indicated at block 308.

If, through the determinations at block 304, a large unbelted occupant in a mid/rearward seating position is not determined, the process 300 proceeds to block 310. At block 310, a determination is made as to the presence of a large belted occupant 22*b* in the vehicle seat 20*b*. This determination, made at least in part via the sensor(s) 144*b*, may include a seat position determination, a seat weight determination, an occupant presence determination, a seatbelt latched determination, or a combination of these determinations.

If, through the determinations at block 310, a large belted occupant in a mid/rearward seating position is determined, the process 300 proceeds to block 312. As indicated at block 312, the actuatable fastener 122*b* is actuated after the trigger tether 256 releases the connection between the anchor tether 252 and the shaping tether 254. This may be done, for example, by delaying actuation of the fastener 122*b* for a predetermined amount of time sufficient to ensure that the connection between the shaping tether 254 and anchor tether 252 is released. Actuation of the actuatable fastener 122*b* also releases the vent tether 258 so that the vent 260 is released to the opened condition. As a result, the air bag 14*b* inflates to the fully deployed with vented pressurization condition of FIGS. 11A-B, as indicated at block 314.

If, through the determinations at block 310, a small belted or unbelted occupant in a forward seating position is not determined, the process 300 proceeds to block 316. At block 316, a determination is made as to the presence of a small belted or unbelted occupant 22*b* in a forward seating position in the vehicle seat 20*b*. This determination, made at least in part via the sensor(s) 144*b*, may include a seat position determination, a seat weight determination, an occupant presence determination, a seatbelt latched determination, or a combination of these determinations.

If, through the determinations at block 316, a small belted or unbelted occupant in a forward seating position is determined, the process 300 proceeds to block 318. As indicated at block 318, the actuatable fastener 122*b* is actuated before the trigger tether 256 releases the connection between the anchor tether 252 and the shaping tether 254. This may be done, for example, by actuating the fastener 122*b* immediately without a time delay to ensure that the connection between the shaping tether 254 and anchor tether 252 is maintained. Actuation of the actuatable fastener 122*b* also releases the vent tether 258 so that the vent 260 is released to the opened condition. As a result, the air bag 14*b* inflates to the reduced size and volume with vented pressurization condition of FIGS. 12A-B, as indicated at block 320.

Advantageously, in view of the above, those skilled in the art will appreciate that the apparatus 10*b* of the embodiment of FIGS. 10-15 provides an apparatus 10*b* in which the air bag 14*b* is deployable to one of three different deployed conditions using a single actively actuatable device, i.e., the actuatable fastener 122*b*. Due to the novel structure and performance of the adaptive tethers disclosed herein, the air bag 14*b* can be placed in one of the fully deployed non-vented condition, the fully deployed vented condition, and the reduced volume vented condition using the actuatable fastener 122*b* as the single actively actuatable device for selecting the desired one of these three conditions. Those skilled in the art will appreciate the advantages in terms of cost, simplicity, reliability realized by providing three selectable configurations using a single actuatable device having two discrete (i.e., non-actuated and actuated) conditions.

From the above description of the invention, those skilled in the art will perceive improvements, changes and modifications. For example, the adaptive tether configurations disclosed herein could be altered in order to adjust the shaping of the associated air bag. For example, the location on the air bag (e.g., the front panel) where the shaping tether is connected may be selected to alter or adjust the resulting shape of the bag. Examples of this are illustrated in FIGS. 2, 6, and 12A, where an alternative configuration of the adaptive tether and the resulting shape of the air bag is illustrated in dashed lines at 350. In this example, deployment of a lower portion of the air bag is restricted as shown. It will thus be appreciated that, depending on the chosen location and configuration of the shaping tether(s), deployment of portions of the air bag adjacent one or more of the head, chest, thorax, and abdomen can be restricted. The location of the adaptive tethers and the resulting shaping is not limited to those illustrated in the figures and may be adjusted to any location to achieve a desired shaping at that location to restrict deployment of the air bag adjacent one or more of the head, chest, thorax, and abdomen of the occupant.

Additionally, more than one adaptive tether may be implemented in the air bag configurations of any of the embodiments disclosed herein. For example, the adaptive tethers illustrated in dashed lines at 350 in FIGS. 2, 6, and 12A may be included in addition to the respective adaptive tethers illustrated in those figures. The number of adaptive tethers implemented in any of the disclosed air bag configurations and the resulting shaping is not limited to those illustrated in the figures. The number of adaptive tethers included in any of the disclosed embodiments may be adjusted to achieve the desired shaping of the air bag.

Furthermore, although the embodiments disclosed herein are illustrated in implementations on a passenger side of the vehicle, those skilled in the art will appreciate that the present invention is intended for and may be implemented on either the driver side of the vehicle or the passenger side of the vehicle. In a driver side implementation, the apparatus would simply be mounted to the vehicle steering wheel instead of being mounted to the instrument panel. While, in this instance, the overall shape of a steering wheel mounted air bag may differ from that of the instrument panel mounted air bag, the basic function of the adaptive tether and vent would be virtually identical.

The above and other such improvements, changes and modifications within the skill of the art are intended to be covered by the appended claims.

Having described the invention, the following is claimed:
1. An air bag module comprising:
an air bag having a deflated condition and an inflated condition;
a structure for supporting the air bag;

a first tether having a first end connected to the structure via an actuatable fastener, and an opposite second end connected to the air bag; and a second tether having a first end fixed to the first tether by a rupturable connection at a location between the first and second ends of the first tether, the second tether having a second end connected to a deployable portion of the air bag.

2. The air bag module recited in claim 1, wherein:

the first tether comprises a first segment comprising a trigger tether and a second segment comprising an anchor tether, the trigger tether comprising the first end of the first tether, the anchor tether comprising the second end of the first tether; and the second tether comprises a shaping tether.

3. An air bag module comprising:

an air bag having a deflated condition and an inflated condition;

a structure for supporting the air bag;

a first tether having a first end connected to the structure via an actuatable fastener, and an opposite second end connected to the air bag, wherein the first tether comprises a first segment comprising a trigger tether and a second segment comprising an anchor tether, the trigger tether comprising the first end of the first tether, the anchor tether comprising the second end of the first tether; and a second tether comprising a shaping tether having a first end secured to the first tether by a releasable connection at a location between the first and second ends of the first tether, the second tether having a second end connected to a deployable portion of the air bag, wherein the actuatable device secures the trigger tether to the vehicle so that the trigger tether becomes tensioned by the shaping tether due to deployment of the air bag, the trigger tether when tensioned rupturing the releasable connection which disconnects the shaping tether from the anchor tether and thereby permits the portion of the air bag to deploy uninhibited.

4. An air bag module comprising:

an air bag having a deflated condition and an inflated condition;

a structure for supporting the air bag;

a first tether having a first end connected to the structure via an actuatable fastener, and an opposite second end connected to the air bag, wherein the first tether comprises a first segment comprising a trigger tether and a second segment comprising an anchor tether, the trigger tether comprising the first end of the first tether, the anchor tether comprising the second end of the first tether; and a second tether comprising a shaping tether having a first end secured to the first tether by a releasable connection at a location between the first and second ends of the first tether, the second tether having a second end connected to a deployable portion of the air bag, wherein the actuatable device is actuatable to release the trigger tether so that the releasable connection maintains the connection between the anchor tether and the shaping tether, the anchor tether and shaping tether in combination restricting deployment of the portion of the air bag.

5. The air bag module recited in claim 2, wherein the air bag takes on a desired shape for helping to protect a vehicle occupant when the anchor tether and shaping tether in combination restrict deployment of the portion of the air bag.

6. The air bag module recited in claim 5, wherein the desired shape of the air bag is for helping to protect a forward positioned vehicle occupant.

7. The air bag module recited in claim 2, wherein the deployable portion of the air bag comprises a portion of the air bag adapted to receive at least one of the head, chest, thorax, and abdomen of the occupant, the shaping tether restricting the portion from reaching a fully deployed condition in response to actuation of the actuatable device.

8. The air bag module recited in claim 2, wherein the air bag comprises a frontal air bag inflatable away from an instrument panel of the vehicle to a position between the instrument panel and a front seat vehicle occupant, the air bag comprising a portion that when deployed is presented toward at least one of the head, chest, thorax, and abdomen of the occupant when normally seated.

9. The air bag module recited in claim 8, wherein the shaping tether is configured and arranged to restrict deployment of the portion of the air bag in response to actuation of the actuatable device, the actuatable device being adapted for actuation in response to a sensed position of the occupant.

10. The air bag module recited in claim 9, wherein the sensed position comprises at least one of a forward positioned occupant and an occupant positioned away from a normally seated position.

11. An air bag module comprising:

an air bag having a deflated condition and an inflated condition;

a structure for supporting the air bag;

a first tether having a first end connected to the structure via an actuatable fastener, and an opposite second end connected to the air bag, wherein the first tether comprises a first segment comprising a trigger tether and a second segment comprising an anchor tether, the trigger tether comprising the first end of the first tether, the anchor tether comprising the second end of the first tether; and a second tether comprising a shaping tether having a first end secured to the first tether by a releasable connection at a location between the first and second ends of the first tether, the second tether having a second end connected to a deployable portion of the air bag, wherein the air bag comprises a frontal air bag inflatable away from an instrument panel of the vehicle to a position between the instrument panel and a front seat vehicle occupant, the air bag comprising a portion that when deployed is presented toward at least one of the head, chest, thorax, and abdomen of the occupant when normally seated, and wherein the shaping tether is configured and arranged to be released and permit unrestricted deployment of the portion of the air bag in response to the actuatable device remaining in the non-actuated condition, the actuatable device being adapted to remain in the non-actuated condition in response to a sensed position of the occupant.

12. The air bag module recited in claim 11, wherein the sensed position comprises a rearward normally seated occupant position.

13. The air bag module recited in claim 1, further comprising a vent for venting inflation fluid from the air bag, the vent being adapted to be closed in response to uninhibited deployment of the portion of the air bag, and being adapted to be open in response to restricted deployment of the portion of the air bag.

14. An air bag module comprising:

an air bag having a deflated condition and an inflated condition;

a structure for supporting the air bag;

a first tether having a first end connected to the structure via an actuatable fastener, and an opposite second end connected to the air bag, wherein the first tether comprises a first segment comprising a trigger tether and a second segment comprising an anchor tether, the trigger tether comprising the first end of the first tether, the anchor tether comprising the second end of the first tether;

a second tether comprising a shaping tether having a first end secured to the first tether by a releasable connection at a location between the first and second ends of the first tether, the second tether having a second end connected to a deployable portion of the air bag, an actuatable vent for venting inflation fluid from the air bag; and a vent tether for actuating the vent, the vent tether being connected to the air bag and being operatively connected to the vent so as to actuate the vent in response to the air bag reaching a predetermined degree of deployment.

15. The air bag module recited in claim 14, wherein the vent tether is restricted from actuating the vent in response to the connection between the shaping tether and anchor tether being maintained, the vent tether actuating the vent in response to the trigger tether releasing the connection between the shaping tether and anchor tether.

16. The air bag module recited in claim 15, wherein the vent is normally open and actuatable to a closed condition, the vent tether being connected to the air bag at or near the location on the air bag where the shaping tether is connected to the air bag.

17. The air bag module recited in claim 15, wherein the vent is normally closed and actuatable to an open condition, the vent tether being connected to the air bag at or near the location on the air bag where the shaping tether is connected to the air bag.

18. The air bag module recited in claim 2, further comprising:

an actuatable vent for venting inflation fluid from the air bag; and a vent tether for actuating the vent, the vent tether being connected to the actuatable fastener and being operatively connected to the vent so as to actuate the vent in response to actuation of the actuatable fastener.

19. The air bag module recited in claim 18, wherein the vent tether is restricted from actuating the vent in response to non-actuation of the actuatable fastener.

20. The air bag recited in claim 19, wherein the air bag is adapted to fully deploy and pressurize in response actuation of the inflator and non-actuation of the actuatable fastener.

21. The air bag recited in claim 20, wherein the actuatable fastener is adapted for non-actuation in response to determining a large unbelted occupant in one of a mid and rearward seating position.

22. The air bag recited in claim 19, wherein the air bag is adapted to fully deploy with vented pressurization in response to actuation of the actuatable fastener after a predetermined delay from actuation of the inflator.

23. The air bag recited in claim 22, wherein the actuatable fastener is adapted for delayed actuation in response to determining a large belted occupant in one of a mid and rearward seating position.

24. The air bag recited in claim 19, wherein the air bag is adapted to deploy with reduced volume and vented pressurization in response to actuation of the actuatable fastener simultaneously or within a predetermined period after actuation of the inflator.

25. The air bag recited in claim 24, wherein the actuatable fastener is adapted for actuation in response to determining a small occupant in a forward seating position.

26. The air bag module recited in claim 2, wherein the trigger tether has a length that is shorter than a length of the anchor tether.

27. The air bag module recited in claim 1, wherein the air bag comprises a frontal air bag inflatable away from an instrument panel of the vehicle to a position between the instrument panel and a front seat vehicle occupant.

28. An air bad module comprising:

an air bag having a deflated condition and an inflated condition;

a structure for supporting the air bag;

a first tether having a first end connected to the structure via an actuatable fastener, and an opposite second end connected to the air bag, wherein the first tether comprises a first segment comprising a trigger tether and a second segment comprising an anchor tether, the trigger tether comprising the first end of the first tether, the anchor tether comprising the second end of the first tether; and a second tether comprising a shaping tether having a first end secured to the first tether by a releasable connection at a location between the first and second ends of the first tether, the second tether having a second end connected to a deployable portion of the air bag, wherein:

the releasable connection comprises tear stitching;

the tear stitching withstands tension applied to the stitching through the shaping tether and anchor tether without rupturing and maintains the connection between the shaping tether and anchor tether; and the tear stitching ruptures in response to tension applied through the shaping tether and trigger tether and releases the connection between the shaping tether and anchor tether.

29. The air bag module recited in claim 28, wherein the tear stitching has a V-shaped configuration comprising leg portions that meet at a break point, the tear stitching, anchor tether, shaping tether, and trigger tether being constructed and arranged such that tension applied to the tear stitching through the shaping tether and anchor tether is distributed over the leg portions of the tear stitching, and such that tension applied to the stitching through the shaping tether and trigger tether is focused on the break point of the tear stitching.

30. An apparatus for helping to protect an occupant of a vehicle, the apparatus comprising:

an inflatable vehicle occupant protection device having a deflated condition and an inflated condition;

a first tether having a first segment comprising an anchor tether that is secured to the vehicle and a second segment comprising a trigger tether;

a second tether comprising a shaping tether secured to a portion of the protection device;

a releasable connection that connects the second tether to the first tether at a location on the first tether where the segments meet;

an actuatable device that secures the trigger tether to the vehicle so that the trigger tether becomes tensioned by the shaping tether due to deployment of the protection device, the trigger tether when tensioned rupturing the releasable connection which disconnects the shaping tether from the anchor tether and thereby permits the portion of the protection device to deploy uninhibited;

the actuatable device being actuatable to release the trigger tether so that the releasable connection maintains the connection between the anchor tether and the shaping tether, the anchor tether and shaping tether in combination restricting deployment of the portion of the protection device.

31. The apparatus recited in claim 1, wherein the rupturable connection ruptures upon non-actuation of the actuatable fastener and remains intact when the actuatable fastener is actuated.

32. The apparatus recited in claim 1, wherein the rupturable connection comprises tear stitching.

33. The apparatus recited in claim 32, wherein first tether applies a peeling force to the tear stitching that causes the stitching to rupture when the actuatable fastener remains in a non-actuated condition, and the first tether applies a parallel force to the tear stitching that the tear stitching can withstand without rupturing when the actuatable fastener is actuated.

* * * * *